(12) United States Patent
Yamamoto et al.

(10) Patent No.: US 8,517,197 B2
(45) Date of Patent: *Aug. 27, 2013

(54) SYNTHETIC RESIN HOLLOW BODY

(75) Inventors: Sadaki Yamamoto, Ichihara (JP);
Kazuyuki Oogi, Ichihara (JP);
Masanobu Sato, Ichihara (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,627

(22) Filed: Dec. 13, 2011

(65) Prior Publication Data

US 2012/0325810 A1    Dec. 27, 2012

Related U.S. Application Data

(63) Continuation-in-part of application No. 12/373,873, filed as application No. PCT/JP2007/064533 on Jul. 18, 2007, now Pat. No. 8,430,258, said application No. 13/324,627 is a continuation-in-part of application No. 12/742,513, filed as application No. PCT/JP2008/070504 on Nov. 11, 2008, now abandoned.

(30) Foreign Application Priority Data

Jul. 19, 2006   (JP) ................................ 2006-197497
May 23, 2007   (JP) ................................ 2007-137209
Nov. 13, 2007   (JP) ................................ 2007-294891

(51) Int. Cl.
*B65D 1/40*    (2006.01)
*B65D 3/22*    (2006.01)
*B65D 6/14*    (2006.01)
*B65D 8/04*    (2006.01)
*B65D 90/02*    (2006.01)

(52) U.S. Cl.
USPC .................. 220/62.22; 220/62.11; 220/62.14; 215/12.1; 215/12.2; 215/DIG. 6; 206/524.1; 206/524.2; 206/524.3; 206/524.6

(58) Field of Classification Search
USPC ............. 220/62.22, 62.11, 62.14; 206/524.6, 206/524.1–524.3; 215/12.1, 12.2, DIG. 6
See application file for complete search history.

(56) References Cited

U.S. PATENT DOCUMENTS 2,041,481 A    5/1936   Otar
2,093,305 A    9/1937   Buck et al.
(Continued)

FOREIGN PATENT DOCUMENTS

DE    19825158    4/1999
EP    1162051    12/2001
(Continued)

OTHER PUBLICATIONS

U.S. Office Action, corresponding to U.S. Appl. No. 13/106,089, dated Mar. 6, 2012, 6 pages.
(Continued)

*Primary Examiner* — J. Gregory Pickett
*Assistant Examiner* — Blaine Neway
(74) *Attorney, Agent, or Firm* — Rankin, Hill & Clark LLP

(57) ABSTRACT

A synthetic resin hollow body (A) that has a satisfactory decorating property and a satisfactory recycle property in a disposal and that is hardly damaged. In addition, a product cost and an operation cost thereof can be suppressed. The synthetic resin hollow body (A) includes: a hollow molding body (a) made of a resin, the hollow molding body (a) capable of holding a liquid material; and a resin sheathing body formed outside the hollow molding body (a) in an integrating manner with the hollow molding body (a), wherein the resin sheathing body is made of a highly transparent synthetic resin having a total ray transmittance of at least 80%.

20 Claims, 14 Drawing Sheets

(56) References Cited

U.S. PATENT DOCUMENTS

| | | | |
|---|---|---|---|
| 2,155,303 A | 4/1939 | Conklin | |
| D124,598 S | 1/1941 | Brodovitch | |
| 2,249,612 A | 7/1941 | Kalowski | |
| 2,830,721 A | 4/1958 | Pinsky et al. | |
| 3,007,594 A | 11/1961 | Wallace | |
| 3,037,652 A | 6/1962 | Wallace | |
| 3,424,825 A | 1/1969 | Marchand | |
| 3,663,259 A | 5/1972 | Barriere | |
| 4,078,508 A | 3/1978 | Schertenleib | |
| 4,133,858 A | 1/1979 | Hayakawa et al. | |
| 4,153,231 A | 5/1979 | Hayakawa et al. | |
| D291,179 S | 8/1987 | Frizon | |
| 4,743,481 A | 5/1988 | Quinlan et al. | |
| 5,480,155 A | 1/1996 | Molitor et al. | |
| D427,055 S * | 6/2000 | Nicolas | D9/689 |
| 6,216,922 B1 | 4/2001 | Bleile et al. | |
| 6,336,553 B1 | 1/2002 | Gordon | |
| 6,461,699 B1 | 10/2002 | Slat et al. | |
| 6,767,630 B2 | 7/2004 | Okuyama | |
| 6,773,748 B2 | 8/2004 | Slat et al. | |
| 6,866,158 B1 | 3/2005 | Sommer et al. | |
| 7,569,171 B2 | 8/2009 | Dieudonat et al. | |
| 2002/0175136 A1 | 11/2002 | Bouix et al. | |
| 2003/0021917 A1 | 1/2003 | Hotaka et al. | |
| 2004/0173559 A1 | 9/2004 | Shih | |
| 2004/0227272 A1 | 11/2004 | Saito | |
| 2006/0043057 A1* | 3/2006 | Shawn | 215/379 |
| 2009/0261097 A1 | 10/2009 | Yamamoto et al. | |

FOREIGN PATENT DOCUMENTS

| | | |
|---|---|---|
| EP | 1243397 | 9/2002 |
| EP | 1457302 | 9/2004 |
| FR | 2207806 | 6/1974 |
| FR | 2485987 | 1/1982 |
| GB | 1440770 | 6/1976 |
| GB | 1468953 | 3/1977 |
| JP | 49-036483 | 4/1974 |
| JP | 49-87493 | 8/1974 |
| JP | 50-002769 | 1/1975 |
| JP | 52-107053 A | 9/1977 |
| JP | 52-159860 | 12/1977 |
| JP | 52-159860 U | 12/1977 |
| JP | 57-043417 | 9/1982 |
| JP | 58-169036 U | 11/1983 |
| JP | 59-150728 | 10/1984 |
| JP | 59-227425 | 12/1984 |
| JP | 64-067316 | 3/1989 |
| JP | 05-269778 | 10/1993 |
| JP | 6-023758 | 2/1994 |
| JP | 6-198668 | 7/1994 |
| JP | 7-178854 | 7/1995 |
| JP | 07-223305 | 8/1995 |
| JP | 8-252872 | 10/1996 |
| JP | 09-011369 | 1/1997 |
| JP | 9-156627 | 6/1997 |
| JP | 10-316123 | 12/1998 |
| JP | 11-277575 | 10/1999 |
| JP | 2001-122952 | 5/2001 |
| JP | 2002-120252 | 4/2002 |
| JP | 2002-240206 | 8/2002 |
| JP | 2002-307482 | 10/2002 |
| JP | 2003-245944 | 9/2003 |
| JP | 2004-268456 | 9/2003 |
| JP | 2003-334846 | 11/2003 |
| JP | 2004-009650 | 1/2004 |
| JP | 2004-083820 | 3/2004 |
| JP | 2004-167777 | 6/2004 |
| JP | 2004-230876 | 8/2004 |
| JP | 2004-527424 | 9/2004 |
| JP | 2005-007818 | 1/2005 |
| JP | 2005-035575 | 2/2005 |
| JP | 2005-171204 | 6/2005 |
| JP | 2005-238726 | 9/2005 |
| JP | 2006-082864 | 3/2006 |
| JP | 2006-181161 | 7/2006 |
| JP | 2006-182442 | 7/2006 |
| JP | 2006-321566 | 11/2006 |
| WO | 84/03065 | 8/1984 |
| WO | 02/094666 | 11/2002 |
| WO | 2008/010597 | 1/2008 |

OTHER PUBLICATIONS

Japanese Office Action dated Jun. 26, 2012, one page.
Japanese Office Action corresponding to application No. 2005-323997 dated Oct. 25, 2011.
Extended European Search Report corresponding to application No. PCT/JP2005/020480 dated Nov. 14, 2011.
International Search Report corresponding to application No. PCT/JP2005/020480 dated Feb. 7, 2006.
European Search Report Dated Nov. 18, 2010.
Chinese Office Action Dated Apr. 13, 2011.
International Search Report for PCT/JP2008/070504 mailed on Feb. 17, 2009.
Japanese Office Action of Corresponding Japanese Application Dated Jul. 26, 2011.
Extended Search report from European Patent Office issued in corresponding European Patent Application No. 07768465.2 dated Feb. 28, 2011.
Form PCT/ISA/210 (International Search Report) dated Oct. 16, 2007.
US Office Action issued in connection with the corresponding U.S. Appl. No. 13/106,089 dated Jul. 15, 2013.

* cited by examiner

Fig. 5
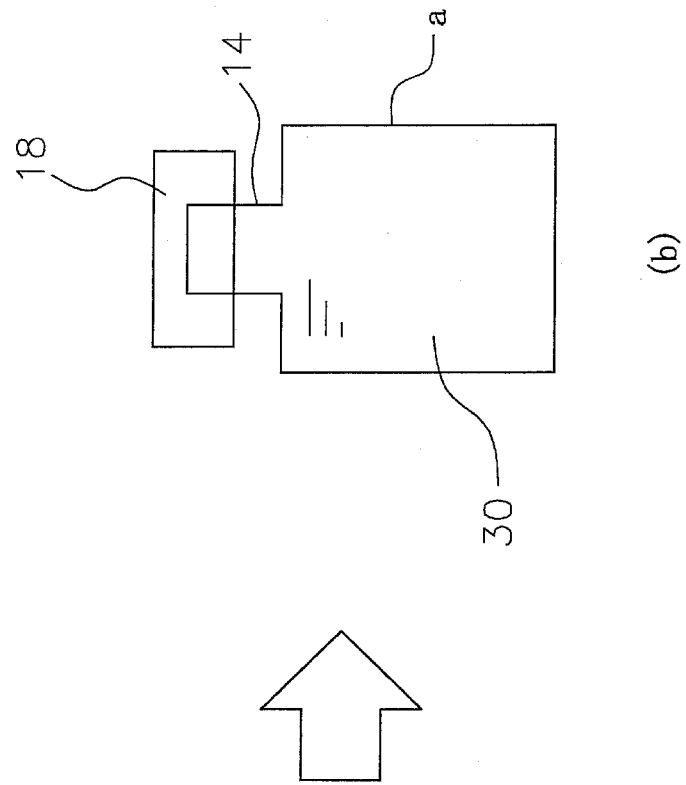
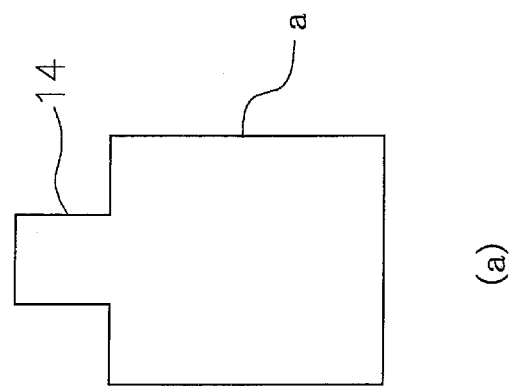

ID="1"/>
SYNTHETIC RESIN HOLLOW BODY

RELATED APPLICATIONS

This application is a continuation-in-part application of prior pending U.S. patent application Ser. No. 12/373,873 filed on Jan. 14, 2009, which is a National Phase Application of International Application No. PCT/JP2007/064533 filed Jul. 18, 2007, which claims the priorities of Japan Patent Application Nos. 2006-197497 filed Jul. 19, 2006 and 2007-137209 filed May 23, 2007, and is also a continuation-in-part application of prior pending U.S. patent application Ser. No. 12/742,513 filed on May 12, 2010, which is a National Phase Application of International Application No. PCT/JP2008/070504, filed Nov. 11, 2008, which claims the priority of Japan Patent Application No. 2007-294891 filed Nov. 13, 2007, the full content of each of the preceding listed patent applications is hereby expressly incorporated by reference.

TECHNICAL FIELD

The present invention relates to a synthetic resin hollow body for holding a liquid material having a flow property such as a cosmetic solution, a chemical, and drinking water. The present invention further relates to a synthetic resin hollow body for holding a powdered material or a liquid material having a flow property such as a cosmetic solution, a chemical, and a beverage. More specifically, the present invention relates to a synthetic resin hollow body of which an outside layer is made of a resin.

BACKGROUND ART

As a container for holding a liquid material such as a cosmetic solution, a chemical, and drinking water, a container with a cap having an excellent corrosion resistance and a satisfactory airtight property has been widely used. The container is generally made of a glass. In some cases, a metal container can also be used to obtain similar effects.

The glass container has a dignity sense and a high quality sense, thereby being suitably used for a container of a cosmetic solution in particular. However, in some cases, the glass container may be easily damaged by a shock during a carrying operation or by a drop in use.

On the other hand, the metal container has an excellent shock resistance in particular. However, the weight and the raw material cost thereof are increased, and a processing thereof is difficult.

In many cases, the glass container and metal container are in a simple shape, thereby lacking in ease of a decoration.

As shown in FIG. 10, JP 2004-527424 proposes a composite container 104 in which a resin is over-molded on a container 100 made of a glass or a metal to form a resin sheathing body 102 outside the container 100 in order to add a design property.

DISCLOSURE OF THE INVENTION

Problems to be Solved by the Invention

However, for such a conventional composite container 104, a material of the core container 100 is a glass or a metal, thereby restricting processability to a certain degree. Consequently, a degree of freedom for a design is insufficient and not satisfactory.

The glass container 100 in such a composite container 104 is covered by the resin sheathing body 102. However, since the core container 100 is made of a glass, a damage caused by a drop cannot be prevented in many cases.

The composite container 104 is made of a combination of different materials composed of a glass and a resin. Consequently, the glass and the resin must be separated in a disposal, thereby involving a disadvantage in relation to a recycle property.

In the case in which a visual contact is carried out to an inside hollow body made of a glass via a resin sheathing body made of an outside molded transparent body, a shape and a profile of the inside hollow body made of a glass cannot be discriminated to a satisfactory extent, and a design property cannot be displayed to a satisfactory extent. For a conventional composite container, an inside hollow body is visible via a transparent resin sheathing body, and the inside hollow body and the outside resin sheathing body are in different shapes. Consequently, the conventional composite container has a design property caused by a combination of the two shapes. However, since the inside hollow body cannot be discriminated to a satisfactory extent, the design property caused by the combination cannot be displayed to a satisfactory extent.

The present invention was made in consideration of such conditions, and an object of the present invention is to provide a synthetic resin hollow body (A) that has a satisfactory decorating property by making a core hollow molding body (inner bottle) (a) of a resin and by making a resin sheathing body of a highly transparent synthetic resin.

Another object of the present invention is to provide a synthetic resin hollow body (A) that is hardly damaged even in the case in which the synthetic resin hollow body is dropped, by making a core hollow molding body (a) of a resin and by making a resin sheathing body of a highly transparent synthetic resin.

Another object of the present invention is to provide a synthetic resin hollow body (A) that is not required to be separated during disposal, thereby having a satisfactory recycle property, by making a core hollow molding body (a) of a resin and by making a resin sheathing body of a highly transparent synthetic resin.

Another object of the present invention is to provide a synthetic resin hollow body (A) capable of suppressing a product cost and an operation cost by making a core hollow molding body (a) of a resin and by making a resin sheathing body of a highly transparent synthetic resin.

Another object of the present invention is to provide a synthetic resin hollow body (A) comprising at least 2 layers of which one is a barrier layer such as EVOH, Polyester, HDPE or similar in order to assure a good product retention and by making a resin sheathing body of a highly transparent synthetic resin.

Another object of the present invention is to provide a synthetic resin hollow body (A) comprising at least 2 layers of which one is an adhesive layer that improves the adhesion to the sheathing layer that will be overmolded as well as contributes to the compatibility during recycling and by making a resin sheathing body of a highly transparent synthetic resin.

Another object of the present invention is to provide a synthetic resin hollow body in which a shape and a profile of a resin hollow molding body can be discriminated with clarity in the case in which a visual contact is carried out to the inside resin hollow molding body via an outside transparent resin sheathing body, whereby a design property due to the resin hollow molding body can be displayed to a satisfactory extent, and a design property caused by a combination of the resin hollow molding body and the outside transparent resin sheathing body can be displayed to a satisfactory extent.

Means for Solving the Problems

The present invention was made in order to solve the above problems of the conventional art. A synthetic resin hollow body (A) in accordance with the present invention is characterized by comprising:

a hollow molding body (a) made of a resin, the hollow molding body (a) capable of holding a liquid material; and a resin sheathing body formed outside the hollow molding body (a) in an integrating manner with the hollow molding body (a), wherein the resin sheathing body can be made of a highly transparent synthetic resin having a total ray transmittance (conforming to JIS K7105, and measured with a sheet having a thickness of 1 mm) of at least 80%. In another embodiment, a synthetic resin hollow body (A) in accordance with the present invention is characterized by comprising:

a hollow molding body (a) made of a resin, the hollow molding body (a) capable of holding a liquid material via an opening portion and of closing the opening portion by a cap member; and a resin sheathing body formed outside the hollow molding body (a) in an integrating manner with the hollow molding body (a), wherein the resin sheathing body can be made of a highly transparent synthetic resin having a total ray transmittance of at least 80%. In the present invention, a total ray transmittance conforms to JIS K7105, and is measured with a sheet having a thickness of 1 mm.

In yet another embodiment, a synthetic resin hollow body (A) in accordance with the present invention is characterized by comprising a hollow molding body (a) made of a resin having a hollow inside (hereafter simply referred to as a resin hollow molding body (a) in some cases) and a highly transparent resin sheathing body that has been integrated with an outside of the resin hollow molding body (a) (hereafter simply referred to as a resin sheathing body in some cases), wherein as a thickness of the highly transparent resin sheathing body for a cross section in a horizontal direction getting across the hollow molding body (a) and the highly transparent resin sheathing body at the major portion of the synthetic resin hollow body, a minimum thickness (X) of the highly transparent resin sheathing body is at least 0.1 mm and a difference of a maximum thickness (Y) and the minimum thickness (X) is at least 2 mm.

By using a highly transparent synthetic resin for the resin sheathing body as described above, the hollow molding body (a) is clearly visible even via the resin sheathing body. In addition, the resin sheathing body has an extremely high transparency, thereby greatly improving a high quality sense, an aesthetic appreciation, and an appearance property. The synthetic resin hollow body (A) in accordance with the present invention is characterized in that the hollow molding body (a) is preferably made of a highly transparent synthetic resin having a total ray transmittance of at least 80%. By using a highly transparent synthetic resin for the hollow molding body (a) as described above, a synergistic effect of the resin sheathing body and the hollow molding body (a) brings about a higher quality sense. In addition, an aesthetic appreciation and an appearance property can be further improved.

The synthetic resin hollow body (A) in accordance with the present invention is characterized in that the cap member is preferably made of a highly transparent synthetic resin having a total ray transmittance of at least 80%. The cap member can also be made of a normal synthetic resin. By using a highly transparent synthetic resin for the cap member as described above, a synergistic effect of the cap member, the resin sheathing body, and the hollow molding body (a) brings about a higher quality sense. In addition, an aesthetic appreciation and an appearance property can be further improved.

The synthetic resin hollow body (A) in accordance with the present invention is characterized in that the highly transparent synthetic resin is an ionomer of an ethylene (meth)acrylic acid copolymer preferably. By using such a highly transparent synthetic resin, the synthetic resin hollow body (A) can be formed at a low cost. In addition, a satisfactory thick-walled molding can be carried out, and a dignity sense of a glass can be obtained, thereby bringing about a high quality sense.

The synthetic resin hollow body (A) in accordance with the present invention is characterized in that the highly transparent synthetic resin is colored or has no color preferably. By such a configuration, the synthetic resin hollow body (A) can have many kinds of variations of colors. In addition, the synthetic resin hollow body (A) can be manufactured corresponding to one selected from many kinds of design concepts.

Preferably, the resin hollow body (A) is produced by processes such as injection molding, injection blow molding, injection stretch blow molding, or extrusion blow molding comprising one or more different individual polymer layers.

The synthetic resin hollow body (A) in accordance with the present invention is characterized in that a light reflecting powder is preferably dispersed in the highly transparent synthetic resin. By such a configuration, a light is reflected from the light reflecting powder and glitters beautifully, thereby further improving an aesthetic appreciation and a high quality sense for the synthetic resin hollow body (A).

The synthetic resin hollow body (A) in accordance with the present invention is characterized in that the resin sheathing body is preferably welded to an external surface of the hollow molding body (a). As described above, the resin sheathing body is welded to an external surface of the hollow molding body (a), thereby preventing the hollow molding body (a) from wobbling or rotating inside the resin sheathing body. Moreover, the boundary line between the both members is hardly visible, thereby obtaining the synthetic resin hollow body (A) having an improved aesthetic appreciation.

The synthetic resin hollow body (A) in accordance with the present invention is characterized in that the hollow molding body (a) is a thin-walled molding body preferably which can comprise one or more individual polymer layers including barrier and adhesive layers. As described above, since the hollow molding body (a) is a thin-walled molding body, in the case in which the hollow molding body (a) is integrated with the resin sheathing body, the boundary line between the both members is hardly visible, thereby obtaining the synthetic resin hollow body (A) having an improved aesthetic appreciation.

Moreover, in the case in which a thin-walled molding body is formed by a blow molding method, productivity can be improved, and an amount of a resin to be used can be suppressed.

The synthetic resin hollow body (A) in accordance with the present invention is characterized in that a thickness of the resin sheathing body is at least 1 mm preferably. As described above, since a thickness of the resin sheathing body is at least 1 mm, a dignity sense of a glass can be obtained, and the resin sheathing body can be formed in many kinds of shapes, thereby obtaining the synthetic resin hollow body (A) having an improved aesthetic appreciation.

The synthetic resin hollow body (A) in accordance with the present invention is characterized in that the hollow molding body (a) is a hollow molding container preferably. As described above, since the hollow molding body (a) is a hollow molding container, a liquid material such as a cosmetic solution, a chemical, and drinking water does not leak and can be held reliably.

The synthetic resin hollow body (A) in accordance with the present invention is characterized in that the hollow molding body (a) is a hollow molding container comprising one or more separate polymer layers comprising adhesive layers and barrier layers. The synthetic resin hollow body (A) in accordance with the present invention is characterized in that the hollow molding body (a) is a hollow molding container with an adhesive layer on its outside for better adhesion to the resin sheathing body.

For the synthetic resin hollow body in accordance with the present invention, a shape of the resin hollow molding body (a) and that of the highly transparent resin sheathing body (b) can be different from each other. By the above described configuration, in the case in which a visual contact is carried out to the inside from a thin wall part of the highly transparent resin sheathing body (b), a contrast can be improved as a whole, whereby the resin hollow molding body (a) can be discriminated with clarity from the outside.

Effect of the Invention

The present invention can provide a synthetic resin hollow body (A) that has a satisfactory decorating property by making a core hollow molding body (a) of a resin and by making a resin sheathing body of a highly transparent synthetic resin.

Moreover, the present invention can provide a synthetic resin hollow body (A) that is hardly damaged even in the case in which the synthetic resin hollow body is dropped, by making a core hollow molding body (a) of a resin and by making a resin sheathing body of a highly transparent synthetic resin.

Furthermore, the present invention can provide a synthetic resin hollow body (A) that is not required to be separated in a disposal, thereby having a satisfactory recycle property, by making a core hollow molding body (a) of a resin and by making a resin sheathing body of a highly transparent synthetic resin.

Furthermore, the present invention can provide a synthetic resin hollow body (A) capable of suppressing a product cost and an operation cost by making a core hollow molding body (a) of a resin and by making a resin sheathing body of a highly transparent synthetic resin.

In the case in which a core hollow molding body (a) is made of a thin glass and has a thin-walled flat bottom, a crack may easily occur during an over-molding of a resin sheathing body. However, the present invention adopts a hollow molding body (a) made of a resin, thereby facilitating an over-molding.

A shape and a profile of the resin hollow molding body (a) can be discriminated with clarity in the case in which a visual contact is carried out to the inside resin hollow molding body via the outside transparent resin sheathing body, whereby a design property can be improved. Moreover, a complicated shape can be adopted since a core part is made of a resin, a satisfactory decorating property can be displayed. Furthermore, a design property can be displayed to a satisfactory extent even by a combination of the two shapes, and the synthetic resin hollow body is hardly damaged.

BRIEF DESCRIPTION OF THE DRAWINGS

FIG. 3A is a cross-sectional view in a longitudinal direction for the synthetic resin hollow body shown in FIG. 3, and FIG. 3B is a cross-sectional view in a horizontal direction for the synthetic resin hollow body shown in FIG. 3.

FIG. 3C is an elevation view showing a synthetic resin hollow body in accordance with another embodiment of the present invention.

FIG. 3D is a cross-sectional view in a horizontal direction for the synthetic resin hollow body shown in FIG. 3C.

FIG. 3E is a cross-sectional view in a horizontal direction for a synthetic resin hollow body in accordance with another embodiment of the present invention.

FIG. 3F is a cross-sectional view in a horizontal direction for a synthetic resin hollow body in accordance with another embodiment of the present invention.

FIG. 3G is a cross-sectional view in a horizontal direction for a synthetic resin hollow body in accordance with another embodiment of the present invention.

FIG. 3H is a cross-sectional view in a horizontal direction for a synthetic resin hollow body in accordance with another embodiment of the present invention.

FIG. 5 shows a hollow molding body (a) in accordance with another embodiment of the present invention. FIG. 5(a) shows a hollow molding body (a) with a cap opened, and FIG. 5(b) shows the hollow molding body of FIG. 5(a) that holds a liquid as a fluid substance and that is closed by a cap member.

FIG. 6(a) shows a state in which a hollow molding body (a) is set in a metal mold, FIG. 6(b) shows a state in which the metal mold is closed, and FIG. 6(c) shows a state in which a resin sheathing body is filled with in such a manner that an external surface of the hollow molding body (a) is covered in an integrating manner with the resin sheathing body.

FIG. 7(a) shows a state in which the metal mold is opened, and FIG. 7(b) shows a state in which the synthetic resin hollow body (A) is detached from the metal mold.

FIG. 8(a) shows a state in which a hollow molding body (a) is set in a metal mold, FIG. 8(b) shows a state in which the metal mold is closed, and FIG. 8(c) shows a state in which a resin sheathing body is filled with in such a manner that an external surface of the hollow molding body (a) is covered in an integrating manner with the resin sheathing body.

FIG. 9(a) shows a state in which the metal mold is opened, and FIG. 9(b) shows a state in which the synthetic resin hollow body (A) is detached from the metal mold.

EXPLANATIONS OF LETTERS OR NUMERALS

Figure 1:
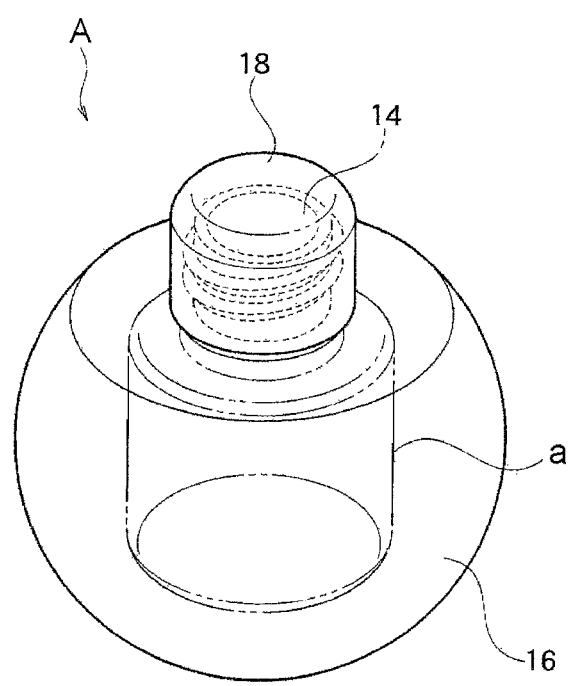
FIG. 1 is a perspective view showing a synthetic resin hollow body (A) in accordance with an embodiment of the present invention.

A, B, C, D, E, and F: synthetic resin hollow body
a: hollow molding body
14: opening portion
16: resin sheathing body
18: cap member
20: convex and concave portion
22: liquid material
24: metal mold
26: metal mold
28: resin inflow port
30: liquid
32: gas
100: container
102: resin sheathing body
104: composite container

BEST MODE OF CARRYING OUT THE INVENTION

Figure 2:
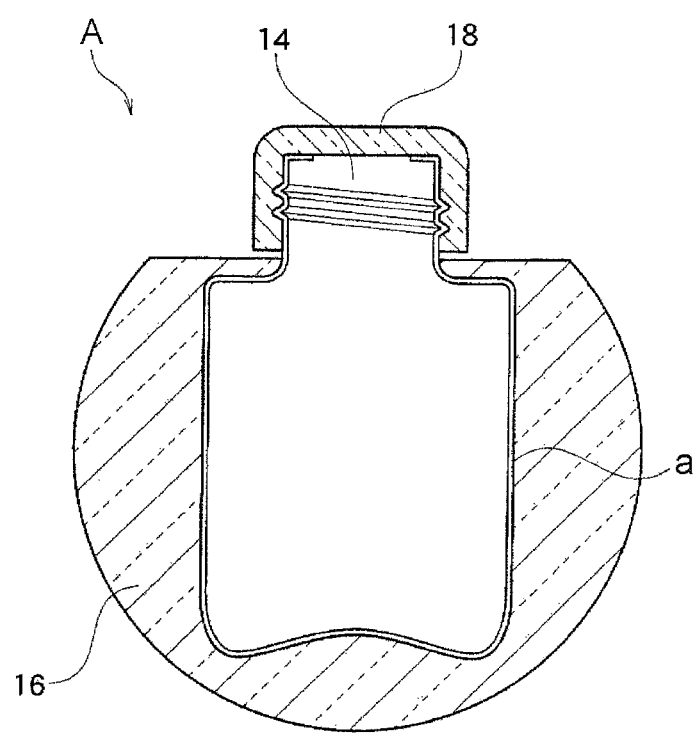
FIG. 2 is a cross-sectional view showing a synthetic resin hollow body (A) in accordance with an embodiment of the present invention.
Figure 3:
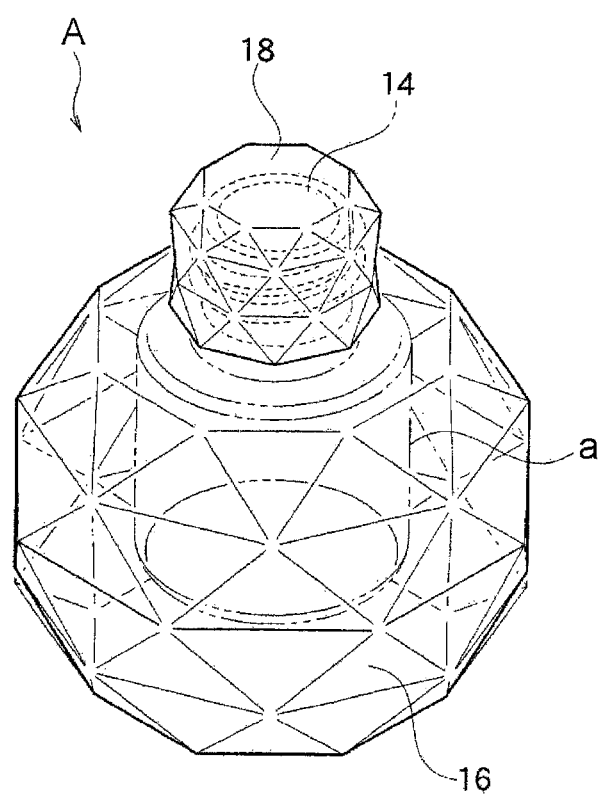
FIG. 3 is a perspective view showing a synthetic resin hollow body (A) in accordance with another embodiment of the present invention.
Figure 3:
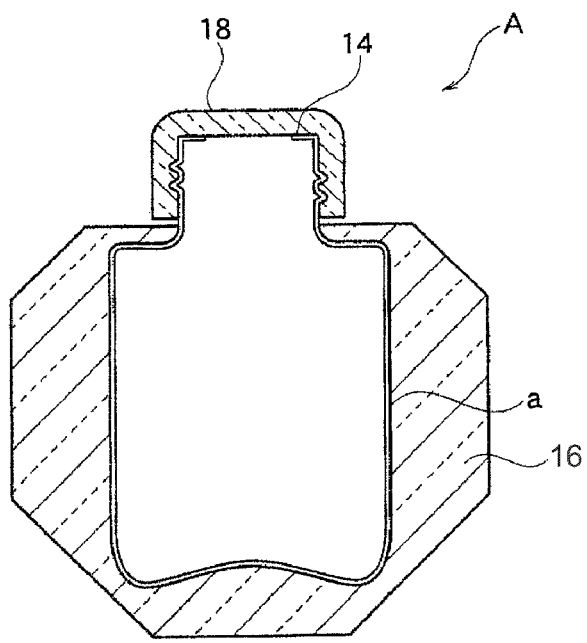
Figure 3:
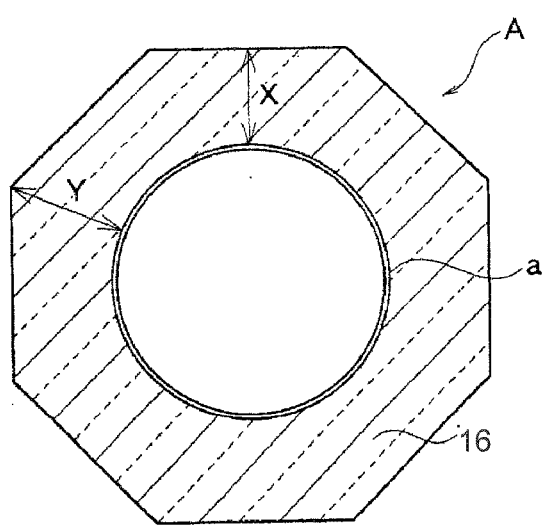
Figure 3:
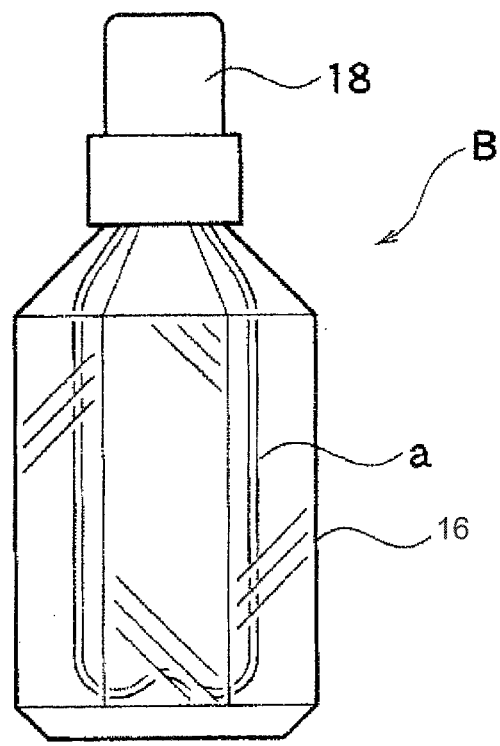
Figure 3:
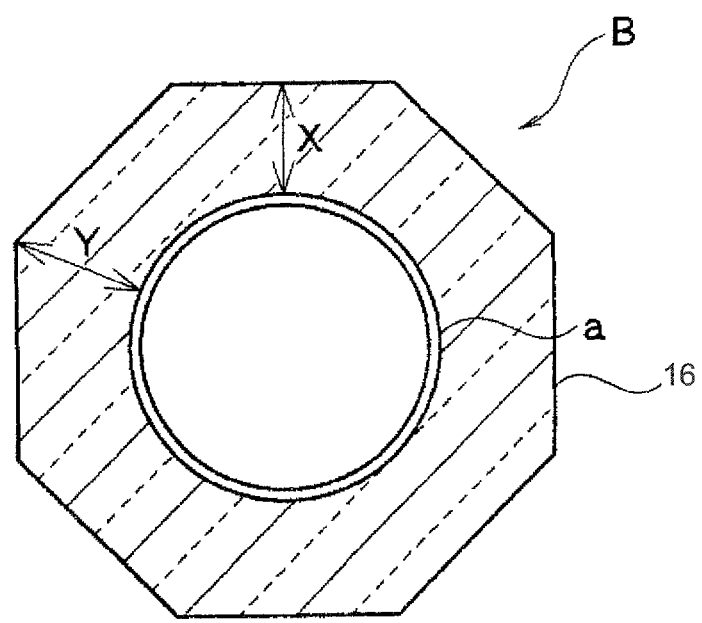
Figure 3:
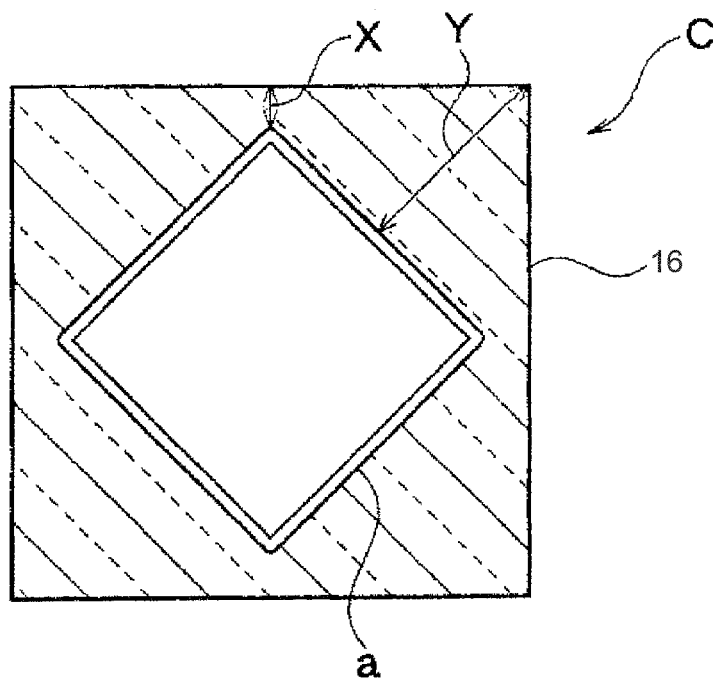
Figure 3:
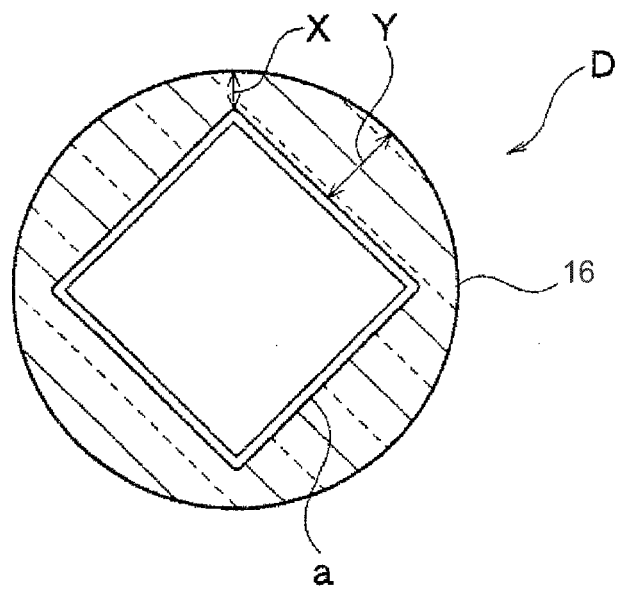
Figure 3:
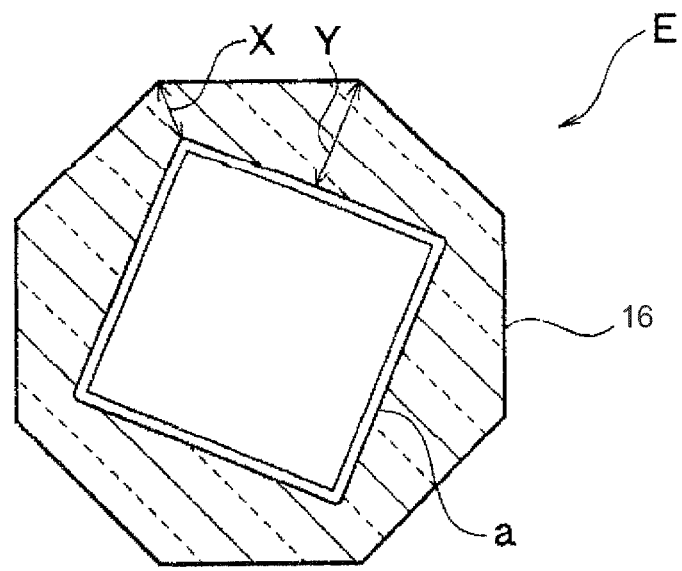
Figure 3:
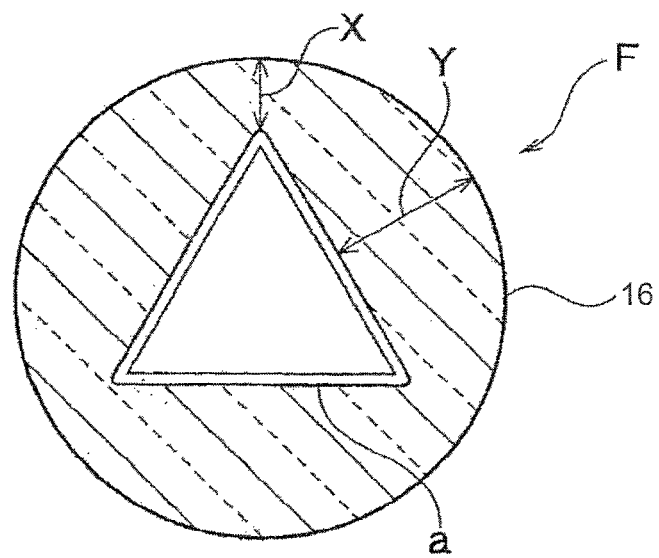
Figure 4:
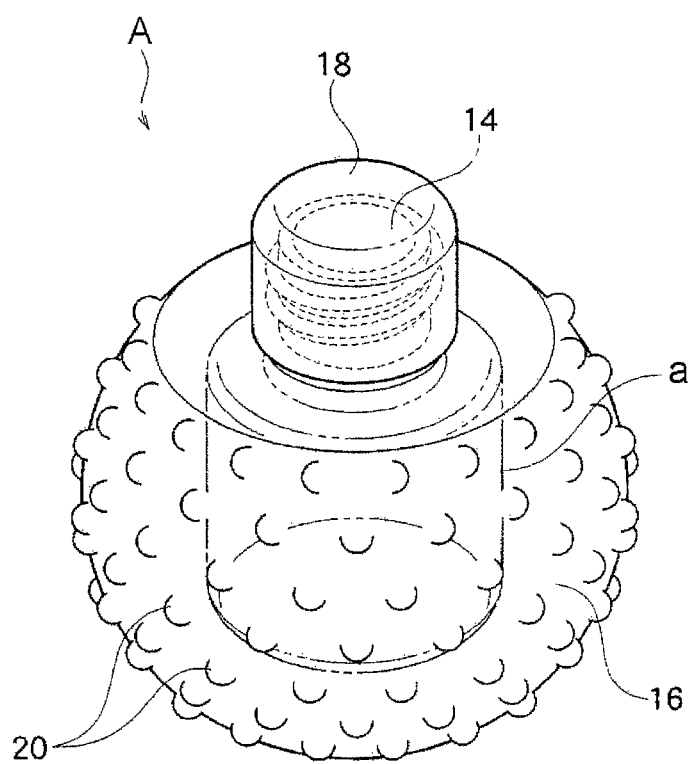
FIG. 4 is a perspective view showing a synthetic resin hollow body (A) in accordance with another embodiment of the present invention.
Figure 6:
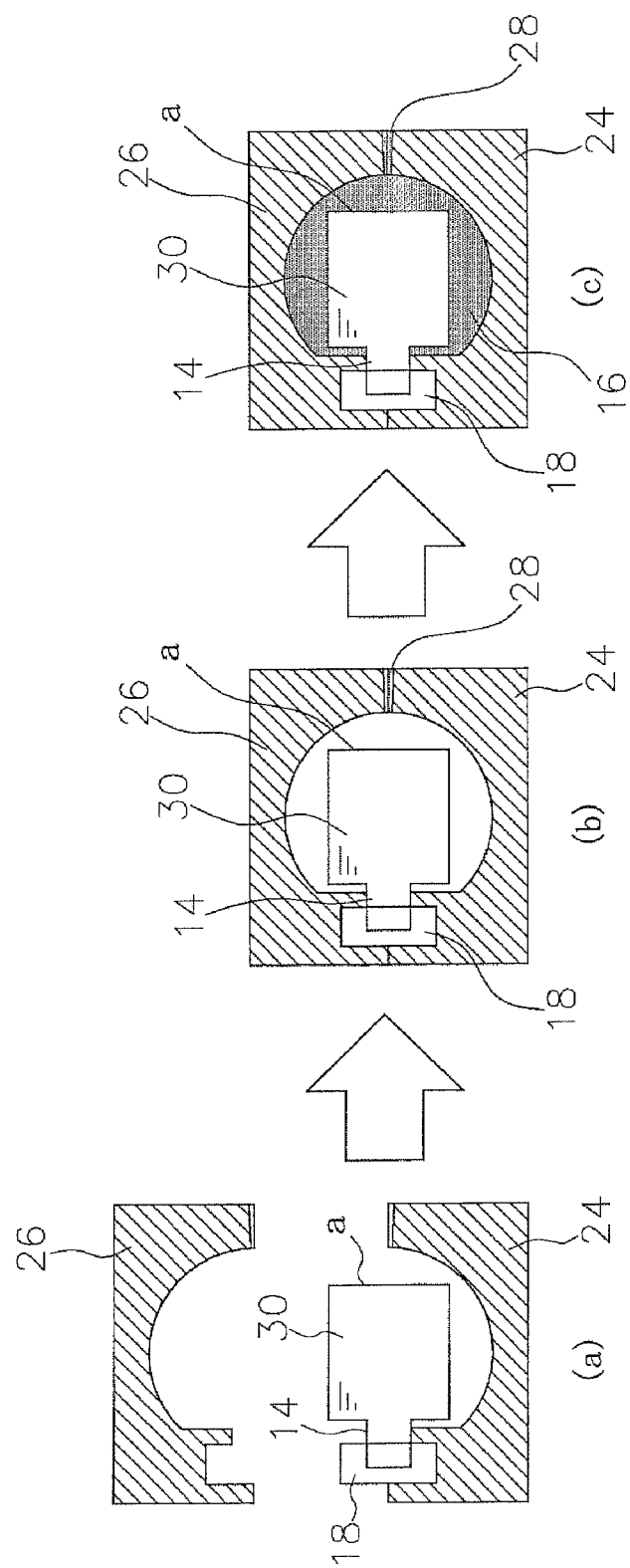
FIG. 6 illustrates a manufacturing method of a synthetic resin hollow body (A) in accordance with an embodiment of the present invention.
Figure 7:
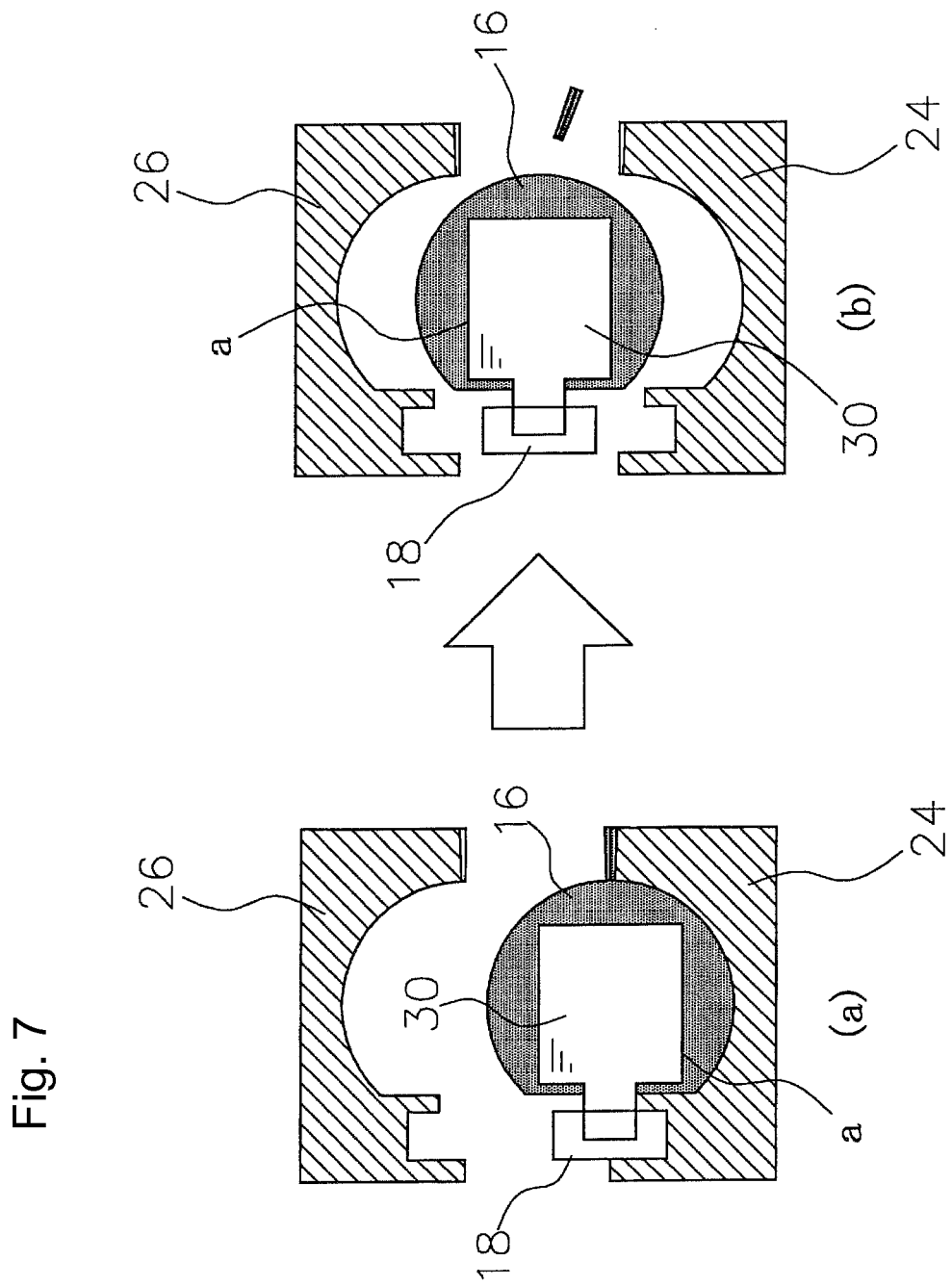
FIG. 7 illustrates a manufacturing method of a synthetic resin hollow body (A) in accordance with an embodiment of the present invention.

An embodiment (example) of the present invention will be described below in detail with reference to the drawings. FIG. 1 is a view showing a synthetic resin hollow body (A) in accordance with an embodiment of the present invention. FIG. 2 is a cross-sectional view showing the synthetic resin hollow body (A) of FIG. 1. FIGS. 3 and 4 are views showing other embodiments of a synthetic resin hollow body (A). FIGS. 5 to 7 illustrate an embodiment of a method for manufacturing a synthetic resin hollow body (A).

<Synthetic Resin Hollow Body (A)>

A synthetic resin hollow body (A) in accordance with the present invention can be for holding a liquid material having a flow property such as a cosmetic solution, a chemical, and drinking water.

As shown in FIG. 1, the synthetic resin hollow body (A) is composed of a hollow molding body (inner bottle) (a) provided with an opening portion 14 that is an inlet or an outlet for a liquid material 22 and a resin sheathing body 16 formed in such a manner that an external surface of the hollow molding body (a) is covered in an integrating manner with the resin sheathing body. That is, the resin sheathing body is over-molded around an external surface of the hollow molding body (a) in the present invention.

A cap member 18 can be attached to the opening portion 14 of the hollow molding body (a) to prevent the liquid material 22 from scattering externally out of the opening portion 14. In this embodiment, the opening portion 14 and the cap member 18 are screwed to each other. However, the present invention is not restricted to such a configuration. For instance, the cap member 18 can also be fitted into the opening portion 14 in an inserting manner. After all, any configuration that can prevent the liquid material 22 from scattering externally out of the opening portion 14 of the hollow molding body (a) can also be adopted.

Moreover, the liquid material 22 that is held in the synthetic resin hollow body (A) can be, for instance, water, an aqueous solution, a cosmetic solution, chemical, or a mixed solution of an oil component (such as organic solvent) and an aqueous component, and an organic solvent. In the present invention, the liquid material includes a pasty material.

As shown in FIG. 2, for such a synthetic resin hollow body (A), the resin sheathing body 16 is formed to cover the entire of the hollow molding body (a) from the bottom end of the opening portion 14. In this embodiment, the resin sheathing body 16 is formed in a spherical shape to a shape of the hollow molding body (a).

In addition, the resin sheathing body 16 can also be decorated as shown in FIG. 3. After all, any shape can be adopted for the resin sheathing body 16.

FIG. 3 is a perspective view showing a synthetic resin hollow body in accordance with an embodiment of the present invention. FIG. 3A is a cross-sectional view in a longitudinal direction for the synthetic resin hollow body shown in FIG. 3, and FIG. 3B is a cross-sectional view in a horizontal direction for the synthetic resin hollow body shown in FIG. 3.

As shown in FIG. 3, the synthetic resin hollow body (A) is composed of a hollow molding body (inner bottle) (a) made of a resin provided with an opening portion 14 that is an inlet or an outlet for a content and a highly transparent resin sheathing body formed in such a manner that an outside of the resin hollow molding body (a) is covered in an integrating manner with the highly transparent resin sheathing body. More specifically, the synthetic resin hollow body (A) in accordance with the present invention is formed by over-molding the highly transparent resin sheathing body 16 on the outer circumferential side of the hollow molding body (a) made of a resin. The hollow molding body (inner bottle) (a) made of a resin provided with the opening portion 14 can hold a powdered material or a liquid material having a flow property such as a cosmetic solution, a chemical, and a beverage.

In the present embodiment, while the resin hollow molding body (a) is formed inside in a generally cylindrical shape, the highly transparent resin sheathing body 16 is formed outside in a spherical shape formed in such a manner that triangle are combined in a multifaceted fashion. In other words, a shape of the inside hollow molding body (a) and that of the highly transparent resin sheathing body 16 are different from each other, and the inside hollow molding body (a) and the highly transparent resin sheathing body 16 are combined.

A cap member 18 is attached to the opening portion 14 of the resin hollow molding body (a) to seal the opening portion 14, thereby preventing a liquid material or a powdered material from coming into contact with an ambient air or from scattering externally out of the opening portion 14 and preventing a grit and dust from entering the opening portion 14. In this embodiment, the opening portion 14 and the cap member 18 are screwed and jointed to each other. However, the present invention is not restricted to such a configuration. For instance, the cap member 18 can also be fitted into the opening portion 14 in an inserting manner.

Moreover, as a liquid material that is held in the synthetic resin hollow body (A), there can be mentioned for instance a powdered material and a liquid material having a flow property such as a cosmetic solution, a chemical, and a beverage. In the present invention, the liquid material includes a pasty material.

As shown in FIG. 3A, for such a synthetic resin hollow body (A) that holds the above contents, the resin sheathing body 16 covers the entire of the lower side of the opening portion 14 of the hollow molding body (a) made of a resin.

As shown in FIG. 3B, as a thickness of the highly transparent resin sheathing body 16 for the synthetic resin hollow body (A) in accordance with the present invention, for a cross section in a horizontal direction for the resin hollow molding body (a) and the highly transparent resin sheathing body 16 at the major portion of the synthetic resin hollow body (A), it is preferable that a minimum thickness (X) of the highly transparent resin sheathing body 16 is at least 0.1 mm and a difference of a maximum thickness (Y) and the minimum thickness (X) of the highly transparent resin sheathing body 16 is at least 2 mm.

Here, the "major portion" of the synthetic resin hollow body (A) represents the main body of the synthetic resin hollow body (A) (an area in which the dimensions and a shape of the highly transparent resin sheathing body are kept almost constant in a cross section in a horizontal direction for the synthetic resin hollow body (A)) like a center part of the container in a vertical direction of the synthetic resin hollow body (A) in a cylindrical shape or in a prismatic shape for instance, and an area other than sections around the opening portion 14 and the bottom face of the synthetic resin hollow body (A). More specifically, the "major portion" of the synthetic resin hollow body (A) represents an area as shown in FIG. 3B for a cross section in a horizontal direction for the synthetic resin hollow body (A) shown in FIG. 3.

In the case in which a resin thickness of the highly transparent resin sheathing body 16 is specified at the major portion of the synthetic resin hollow body (A) as described above, a contrast appears with clarity due to a difference of a resin thin part and a resin thick part in the case in which a visual contact is carried out to the inside. Moreover, it is preferable that a thickness increases by slow degrees from the minimum thickness (X) to the maximum thickness (Y).

As shown in FIGS. 2 and 3A, in one embodiment, a thickness of center of bottom portion of the resin sheathing body is different from a thickness of peripheral of bottom portion of the resin sheathing body. In one embodiment, the thickness of center of bottom portion of the resin sheathing body is larger than the thickness of peripheral of bottom portion of the resin sheathing body.

As shown in FIGS. 2 and 3A, in one embodiment, at a vertical cross section passing through the hollow molding body and the resin sheathing body of the synthetic resin hollow body, a side portion of the resin sheathing body over a side wall of the hollow molding body has first and second portions, and a thickness of the first portion is different from a thickness of the second portion. In one embodiment, a thickness of an upper portion of the side portion of the resin sheathing body is smaller than a thickness of a center portion of the side portion of the resin sheathing body. In another embodiment, a thickness of a lower portion of the side portion of the resin sheathing body is smaller than a thickness of a center portion of the side portion of the resin sheathing body.

As shown in FIGS. 2 and 3A, in one embodiment, at a vertical cross section passing through the hollow molding body and the resin sheathing body of the synthetic resin hollow body, the side portion of the resin sheathing body over the side wall of the hollow molding body has first, second, and third portions, thicknesses of the first, second, and third portions are different from each other. For example, the second portion is a center portion of the side portion of the resin sheathing body, and the third portion is a lower portion of the side portion of the resin sheathing body.

FIGS. 3C and 3D show another embodiment of a synthetic resin hollow body in accordance with the present invention. Elements substantially equivalent to those illustrated in FIGS. 3, 3A, and 3B are numerically numbered similarly and the detailed descriptions of the equivalent elements are omitted.

For the synthetic resin hollow body 16 shown in FIGS. 3C and 3D, the resin hollow molding body (a) that is formed inside is in a cylindrical shape, and a cross section in a horizontal direction for an external shape of the highly transparent resin sheathing body 16 is in an octagon shape. In other words, a cross-sectional shape in a horizontal direction of the resin hollow molding body (a) and that of the highly transparent resin sheathing body 16 are different from each other.

It is preferable that the minimum thickness (X) at the major portion of the highly transparent resin sheathing body 16 is at least 0.1 mm, in particular at least 1 mm, and the maximum thickness (Y) of the highly transparent resin sheathing body 16 is 50 mm or less, in particular 30 mm or less.

Since a shape of the resin hollow molding body (a) and that of the highly transparent resin sheathing body are different from each other as described above, a part of the minimum thickness (X) and a part of the maximum thickness (Y) can be discriminated with clarity, whereby the resin hollow molding body (a) disposed inside can be discriminated with clarity from the outside. Moreover, in the case in which a liquid of a blue color or an opaque white color has been stored into the resin hollow molding body (a), the color appears outside via a transparent body, whereby a shape and a profile of the resin hollow molding body (a) can be discriminated with clarity.

FIG. 3E is a cross-sectional view for a major portion of a synthetic resin hollow body (C) in accordance with another embodiment of the present invention. The synthetic resin hollow body (C) in accordance with the present embodiment is composed of a resin hollow molding body (a) in which a cross section in a horizontal direction is in a quadrangular shape and a highly transparent resin sheathing body 16 in which a cross section in a horizontal direction is in a quadrangular shape.

A minimum thickness (X) and a maximum thickness (Y) at a major portion are configured by arranging the resin hollow molding body (a) and the highly transparent resin sheathing body 16 at the positions rotated by an angle of 45 degrees.

An example of a synthetic resin hollow body (D) in accordance with another embodiment shown in FIG. 3F is a combination of a resin hollow molding body (a) in which a cross section in a horizontal direction is in a quadrangular shape and a highly transparent resin sheathing body 16 in which a cross section in a horizontal direction is in a cylindrical shape.

An example of a synthetic resin hollow body (E) in accordance with another embodiment shown in FIG. 3G is a combination of a resin hollow molding body (a) in which a cross section in a horizontal direction is in a quadrangular shape and a highly transparent resin sheathing body 16 in which a cross section in a horizontal direction is in an octagon shape. An example of a synthetic resin hollow body (F) in accordance with another embodiment shown in FIG. 3H is a combination of a resin hollow molding body (a) in which a cross section in a horizontal direction is in a triangular shape and a highly transparent resin sheathing body 16 in which a cross section in a horizontal direction is in a cylindrical shape.

For any one of the above embodiments, a minimum thickness (X) at a major portion of the highly transparent resin sheathing body is at least 0.1 mm and a difference of a maximum thickness (Y) and the minimum thickness (X) at a major portion of the highly transparent resin sheathing body is at least 2 mm.

While the preferred embodiments of the present invention have been described above, the present invention is not restricted to the embodiments. For instance, any shapes of the resin hollow molding body (a) and the highly transparent resin sheathing body and a combination of any shapes can be adopted depending on an intended purpose of a user and a use application. Moreover, an article that is hold in the synthetic resin hollow body is not restricted in particular.

The point is any shapes and any combination of shapes can be adopted and a color of the content is not restricted in particular providing the resin hollow molding body (a) can be discriminated via the highly transparent resin sheathing body. For instance, the highly transparent resin sheathing body in a cylindrical shape can also be combined with the resin hollow molding body (a) in a cylindrical shape. Moreover, the centers of the inside container and the outside container can be shifted from each other, whereby a thickness of one side of the highly transparent resin sheathing body is larger and a thickness of the other side is smaller.

A character or a graphic can be printed on an external surface of the hollow molding body (a) before forming the resin sheathing body 16. In this case, the printed section of the hollow molding body (a) is protected by the resin sheathing body 16 at all times. Consequently, the printed section can be maintained to be clean as long as possible.

As shown in FIG. 4, a decorative convex and concave portion 20 can be formed on an external surface of the resin sheathing body 16. By such a configuration, the synthetic resin hollow body (A) can have an increased design variation, an aesthetic appreciation, and a high quality sense.

For such a synthetic resin hollow body (A), it is preferable to use a highly transparent synthetic resin as a material of the resin sheathing body 16. It is more preferable to use a synthetic resin having a total ray transmittance (conforming to JIS K7105, and measured with a sheet having a thickness of 1 mm) in the range of 80% to 100%, more preferably in the range of 85% to 100%.

As a material of a highly transparent synthetic resin that satisfies the above range of a transmittance, an ionomer resin, an acrylic resin, a polyester resin, and styrene resins (such as a styrene acrylonitrile copolymer resin and a styrene methylmethacrylate copolymer resin) can be used. Preferably, an ionomer resin and a polyester resin can be used. More preferably, an ionomer resin can be used.

As an ionomer resin, a carboxyl group of an ethylene unsaturated carboxylic acid copolymer containing unsaturated carboxylic acid of 1 to 40 weight % can be used for instance. At least part (generally more than 0 mol % and up to 100 mol %, preferably up to 90 mol %) of the carboxyl group is neutralized by metal ions.

An ethylene unsaturated carboxylic acid copolymer that is a base polymer of an ionomer resin can be obtained by copolymerizing ethylene, and unsaturated carboxylic acid, and optionally any other polar monomers. As unsaturated carboxylic acid, acrylic acid, methacrylic acid, fumaric acid, maleic acid, anhydrous maleic acid, monomethyl maleate, and monoethyl maleate can be mentioned. In particular, methacrylic acid is preferable. As a polar monomer that can be a copolymer component, vinyl ester such as vinyl acetate optionally and vinyl propionate, unsaturated carboxylic acid ester such as methyl acrylate, ethyl acrylate, isopropyl acrylate, n-butyl acrylate, isobutyl acrylate, n-hexyl acrylate, isooctyl acrylate, methyl methacrylate, dimethyl maleate, and diethyl maleate, and carbon monoxide can be mentioned. In particular, unsaturated carboxylic acid ester is a suitable copolymer component.

The metal ion is a metal ion having a valence of monovalence, bivalence, or trivalence, in particular, a metal ion having a valence of monovalence, bivalence, or trivalence of the groups IA, IIA, IIIA, IVA, and VIII in the element periodic law. More specifically, there can be mentioned $Na^+$, $K^+$, $Li^+$, $Cs^+$, $Ag^+$, $Hg^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Sn^{++}$, $Pb^{++}$, $Fe^{++}$, $Co^{++}$, $Ni^{++}$, $Zn^{++}$, $Al^{+++}$, $Sc^{+++}$, $Fe^{+++}$, and $Y^{+++}$.

The above materials are excellent in a transparency, a shock resistance, and a mar-proof property. In addition, a thick-walled molding is possible and a dignity sense of a glass can be obtained. Consequently, these materials are suitable for a material of the resin sheathing body 16. In the present invention, it is preferable that a thickness of the resin sheathing body 16 is at least 1 mm.

Any resin material can be used for the hollow molding body (a) made of a resin and the cap member 18. There can be used for instance a polyolefin series resin (such as polyethylene and polypropylene), polyester (PET (polyethylene terephthalate)), PETG, PCTG, PCT (polycyclohexane dimethyl terephthalate), PCTA, PEN (such as polyethylene naphthalate), an acrylic resin, a styrene series resin (such as a styrene acrylonitrile copolymer resin and a styrene methyl methacrylate copolymer resin), a cycloolefin polymer, polycarbonate, polyamide, an ionomer resin, and PAN (polyacrylonitrile). In the case in which a material the same as that of the resin sheathing body is used, a synergistic effect with the resin sheathing body can be obtained, thereby improving a high quality sense, an appearance property, and an aesthetic appreciation of the synthetic resin hollow body (A).

As described later, the hollow molding body (a) is set in a metal mold, and a molten resin is flown into the metal mold and on an external surface of the hollow molding body (a) to form the resin sheathing body 16. Consequently, it is preferable that the hollow molding body (a) is made of polyester or polyamide that has a comparatively high melting temperature in the case in which a highly transparent synthetic resin is used.

Moreover, it is possible and preferable to use the resin hollow molding body (a) composed of multiple layers of which one layer is a barrier layer in order to improve a barrier characteristic.

As a material that is used for a barrier layer, there can be mentioned for instance an ethylene vinyl alcohol copolymer (EVOH) and polyamide.

Moreover, it is possible to be provided with an adhesive layer in order to improve an adhesive property of the barrier layer to other layers similarly to an adhesive property to the highly transparent resin sheathing body 16.

In the case in which a liquid material that is held in the resin hollow molding body (a) is a chemical, it is preferable to use polyethylene, polypropylene, or an ionomer resin that has a comparatively excellent chemical resistance in highly transparent synthetic resins.

Similarly to the above hollow molding body (a), for the cap member 18, it is preferable to use polyethylene, polypropylene, or an ionomer resin that has a comparatively excellent chemical resistance in highly transparent synthetic resins since the cap member 18 may partially come into contact with the chemical.

Such a highly transparent synthetic resin may be colored or may have no color. Moreover, the hollow molding body (a), the resin sheathing body 16, and the cap member 18 can have different colors from each other. As a matter of course, in the case in which the hollow molding body (a) is a hollow molding body formed by a method of welding two molding bodies using a vibration welding method, the two molding bodies having different colors can be welded to form the hollow molding body (a).

In the case in which a blue highly transparent synthetic resin in which Heliogen Blue K6911D (manufactured by BASF Company) is contained in ionomer is used for molding, the material can be colored to be blue.

Even in the case in which a character or a graphic is generated on a surface of the hollow molding body (a), the character or the graphic that has been generated on the hollow molding body (a) is visible reliably from the outside of the resin sheathing body 16 by using such a highly transparent synthetic resin. Consequently, a high quality sense, an aesthetic appreciation, and an appearance property can be improved for the synthetic resin hollow body (A).

Moreover, in the case in which a light reflecting powder (not shown) is dispersed in the highly transparent synthetic resin, a light is reflected from the light reflecting powder and glitters, thereby further improving a high quality sense.

As such a light reflecting powder, it is preferable to use a light reflecting powder in which a metal or metal oxide is coated on a surface of mica that is a core of the light reflecting powder.

Moreover, in the present embodiment, since both of the resin hollow molding body (a) and the resin sheathing body, it is not necessary to separate the resin hollow molding body (a) and the resin sheathing body (b) from each other in a disposal, whereby a recycle property is extremely satisfactory.

Furthermore, in the case in which the resin hollow molding body (a) that is a core is made of a resin, and the resin sheathing body is made of a highly transparent synthetic resin, a high quality sense, an aesthetic appreciation, and an appearance property can be extremely improved for the synthetic resin hollow body (A).

<Manufacturing Method of the Synthetic Resin Hollow Body (A)>

The resin hollow molding body (a) can be previously manufactured by a blow molding method or by a method of forming two divided molding bodies in advance and welding the two bodies using a vibration welding method. However, the manufacturing method is not restricted in particular. Moreover, in the case in which a resin sheathing body is integrated with an outside of the resin hollow molding body (a), the resin hollow molding body (a) is set in a pair of metal mold and is over-molded in the state in which a cap member has been mounted. The method for integrating the resin sheathing body with an outside of the resin hollow molding body (a) is not restricted in particular.

Subsequently, the manufacturing method of the synthetic resin hollow body (A) in accordance with the present invention will be described below. As shown in FIG. 5(a), a hollow molding body (a) is prepared at first. The hollow molding body (a) is previously manufactured by a blow molding method or by a method of forming two divided molding bodies in advance and welding the two bodies using a vibration welding method. The manufacturing method is not restricted in particular. In the case in which a blow molding is carried out, the hollow molding body (a) can be a thin-walled molding body, and a thickness of the wall is preferably in the range of 0.1 to 10 mm, more preferably in the range of 0.2 to 8 mm.

As shown in FIG. 5(b), liquid 30 is then flown as a fluid substance into the hollow molding body (a) via an opening portion 14, and a cap member 18 is attached to the opening portion 14. The liquid 30 to be filled with should be at least 50% of the total amount that can be flown into the hollow molding body (a), preferably at least 70%, in such a manner that the hollow molding body (a) is prevented from being deformed by a resin pressure in the case in which the hollow molding body (a) is set in metal molds 24 and 26 described later and a molten resin is flown into the metal molds.

The liquid 30 is heated in the metal molds 24 and 26 to a certain degree. Consequently, it is preferable that such liquid 30 has normal physical properties even if heated.

In the case in which abnormal physical properties may occur by heating, the liquid 30 that can be heated such as water is flown into the hollow molding body (a) and removed after a resin filling, and a desired liquid material 22 is then held in the hollow molding body (a).

As a matter of course, a desired liquid material 22 can also be held in the hollow molding body (a) in advance in such a state. However, the desired liquid material 22 is heated in the metal molds 24 and 26 to a certain degree as described above.

Consequently, only in the case in which abnormal physical properties do not occur for the liquid material 22, the desired liquid material 22 can be held in the hollow molding body (a) in advance.

The liquid 30 to be used in molding is preferably water or alcohol in such a manner that it is not required to wash the hollow molding body (a) and that the hollow molding body (a) is only dried after the synthetic resin hollow body (A) is manufactured and the liquid 30 is removed from the hollow molding body (a).

As shown in FIG. 6(a), the hollow molding body (a) is then set in the metal molds 24 and 26 in such manner that a container portion of the hollow molding body (a) floats in a space in the metal molds 24 and 26. In this embodiment, a cap member 18 is attached to the opening portion 14 of the hollow molding body (a) before the hollow molding body (a) is set in the metal molds 24 and 26. However, a gate (not shown) can be formed in the metal molds 24 and 26 in such a manner that the liquid 30 does not flow out of the opening portion 14 of the hollow molding body (a). In addition, a screw shape (not shown) can also be formed on the opening portion 14 of the hollow molding body (a) in advance and the opening portion 14 can be screwed into the metal molds 24 and 26. By such configurations, the hollow molding body (a) can be set in the metal molds 24 and 26 without attaching the cap member 18 to the hollow molding body (a).

As shown in FIG. 6(b), the metal molds 24 and 26 are then closed. As shown in FIG. 6(c), a highly transparent synthetic resin is filled in the metal molds 24 and 26 via a resin inflow port 28. By such a process, the highly transparent synthetic resin that has been molten is over-molded on the periphery of the hollow molding body (a) from the bottom end of the opening portion 14 of the hollow molding body (a) in the metal molds 24 and 26.

As shown in FIG. 7(a), the metal molds 24 and 26 are opened after the highly transparent synthetic resin is hardened. As shown in FIG. 7(b), the synthetic resin hollow body (A) is detached from the metal molds 24 and 26, and a runner and a sprue are detached. The liquid 30 is then removed from the hollow molding body (a). As a result, the synthetic resin hollow body (A) in which a resin sheathing body 16 is formed in an integrating manner with the hollow molding body (a) can be obtained as shown in FIG. 1. In the case in which the hollow molding body (a) is not provided with the cap member 18, the liquid 30 is removed from the hollow molding body (a) after the synthetic resin hollow body (A) is detached from the metal molds 24 and 26, and the cap member 18 is attached to the opening portion 14 of the hollow molding body (a). By such a process, the synthetic resin hollow body (A) in which the resin sheathing body 16 is formed in an integrating manner with the hollow molding body (a) can be obtained similarly to the above. In this case, the resin sheathing body 16 is welded to an external surface of the hollow molding body (a), thereby preventing the hollow molding body (a) from wobbling or rotating in the resin sheathing body 16. Moreover, the boundary line between the both members is hardly visible, thereby obtaining an improved aesthetic appreciation and an improved appearance property.

In the present invention, a coating, a printing, or a hard coating can be carried out to the resin sheathing body 16 to impart a flaw resistance and a design property to the resin sheathing body 16. By such a method, after the resin sheathing body 16 is filled with, the liquid 30 is removed from the hollow molding body (a), and a desired liquid material 22 is flown into the hollow molding body (a). Consequently, the synthetic resin hollow body (A) that holds the liquid material 22 can be manufactured. Therefore, it is unnecessary to adopt the conventional complicated processes such as defrosting the frozen liquid 30, removing the content, and filling with the liquid material 22. Accordingly, a manufacturing cost can be reduced.

Moreover, both the hollow molding body (a) and the resin sheathing body 16 are made of a resin. Consequently, the hollow molding body (a) and the resin sheathing body 16 are not required to be separated from each other in a disposal, thereby having a satisfactory recycle property. Furthermore, after the synthetic resin hollow body (A) is manufactured, in the case in which the liquid 30 that has been held in the hollow molding body (a) in molding is removed and a desired liquid material 22 is newly held in the hollow molding body (a), water can be used as the liquid 30 that is held in the hollow molding body (a) in molding. Consequently, the inside wall of the hollow molding body (a) is only dried after removing water, thereby preventing the manufacturing process from being complicated and reducing a manufacturing cost of the synthetic resin hollow body (A).

Furthermore, the core hollow molding body (a) is made of a resin, and the resin sheathing body 16 is made of a highly transparent synthetic resin. Consequently, a high quality sense, an aesthetic appreciation, and an appearance property can be extremely improved for the synthetic resin hollow body (A).

Figure 8:
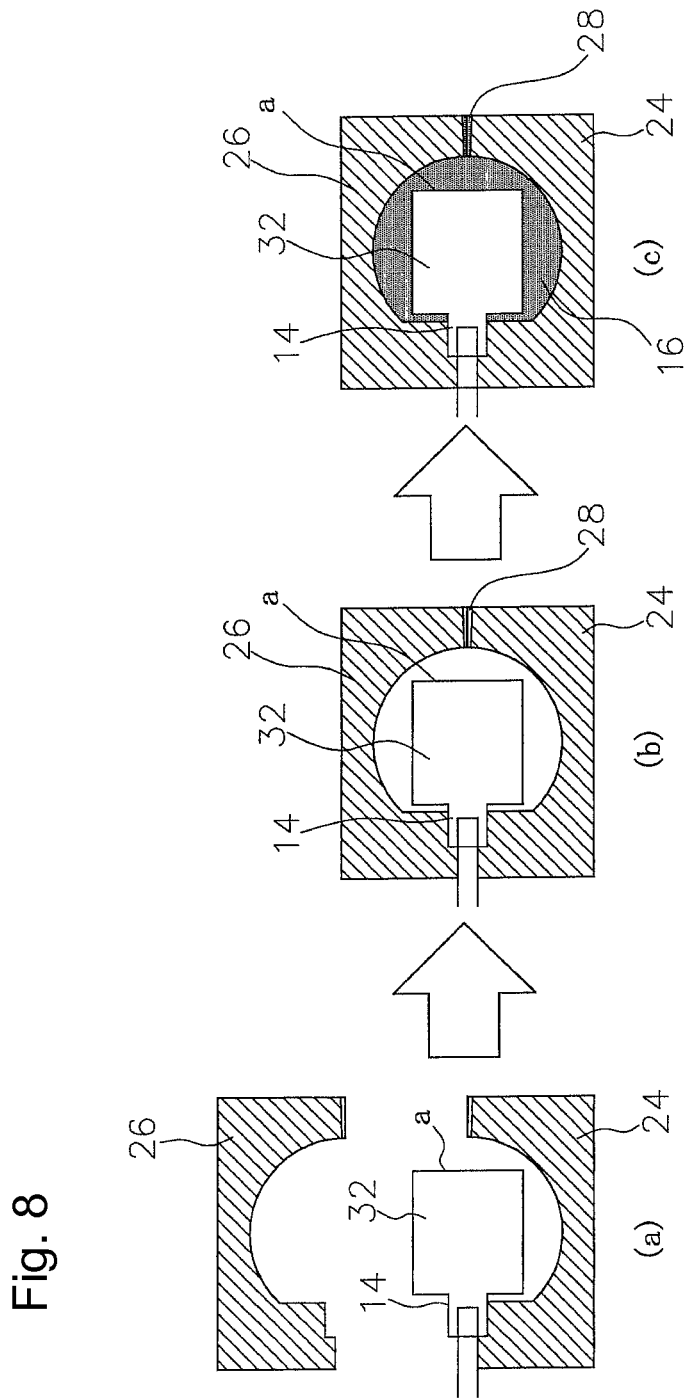
FIG. 8 illustrates a manufacturing method of a synthetic resin hollow body (A) in accordance with another embodiment of the present invention.

FIG. 8 illustrates another embodiment of a synthetic resin hollow body (A) in accordance with the present invention similarly to FIGS. 1 to 7. The synthetic resin hollow body (A) shown in FIG. 8 has a configuration basically equivalent to that of the synthetic resin hollow body (A) of the embodiment shown in FIGS. 1 to 7. Consequently, elements equivalent to those illustrated in FIGS. 1 to 7 are numerically numbered similarly and the detailed descriptions of the equivalent elements are omitted.

A point different from the above embodiment for the manufacturing method of the synthetic resin hollow body (A) shown in FIG. 8 is that a gas 32 is used as a fluid substance. In this case, as shown in FIG. 8(a), a hollow molding body (a) in an empty state is set in the metal molds 24 and 26, and the gas 32 is made to blow in an opening portion 14 of the hollow molding body (a). At this time, a pressure of the gas 32 that blows in the hollow molding body (a) is preferably in the range of 0.04 to 1.0 MPa. The gas 32 to be used is not restricted in particular. For instance, air, nitrogen, oxygen, an inert gas, and a carbon dioxide gas can be used. In particular, air is preferably used.

As shown in FIG. 8(b), the metal molds 24 and 26 are then closed while the gas 32 is made to blow in the hollow molding body (a). As shown in FIG. 8(c), a molten resin is flown into the metal molds 24 and 26 via a resin inflow port 28. By such a process, the molten resin covers the hollow molding body (a).

The molten resin is cooled and hardened by maintaining this state for a certain time. At this time, by reducing a pressure of the gas 32 that has blown in the hollow molding body (a) to make the pressure less than that at the resin filling, a resin sheathing body 16 can be formed in such a manner that an external surface of the hollow molding body (a) is covered in an integrating manner with the resin sheathing body 16 without a distortion generated between the hollow molding body (a) and the resin sheathing body 16. At this time, a pressure of the gas 32 is preferably reduced to the range of 0.02 to 0.5 MPa.

Figure 9:
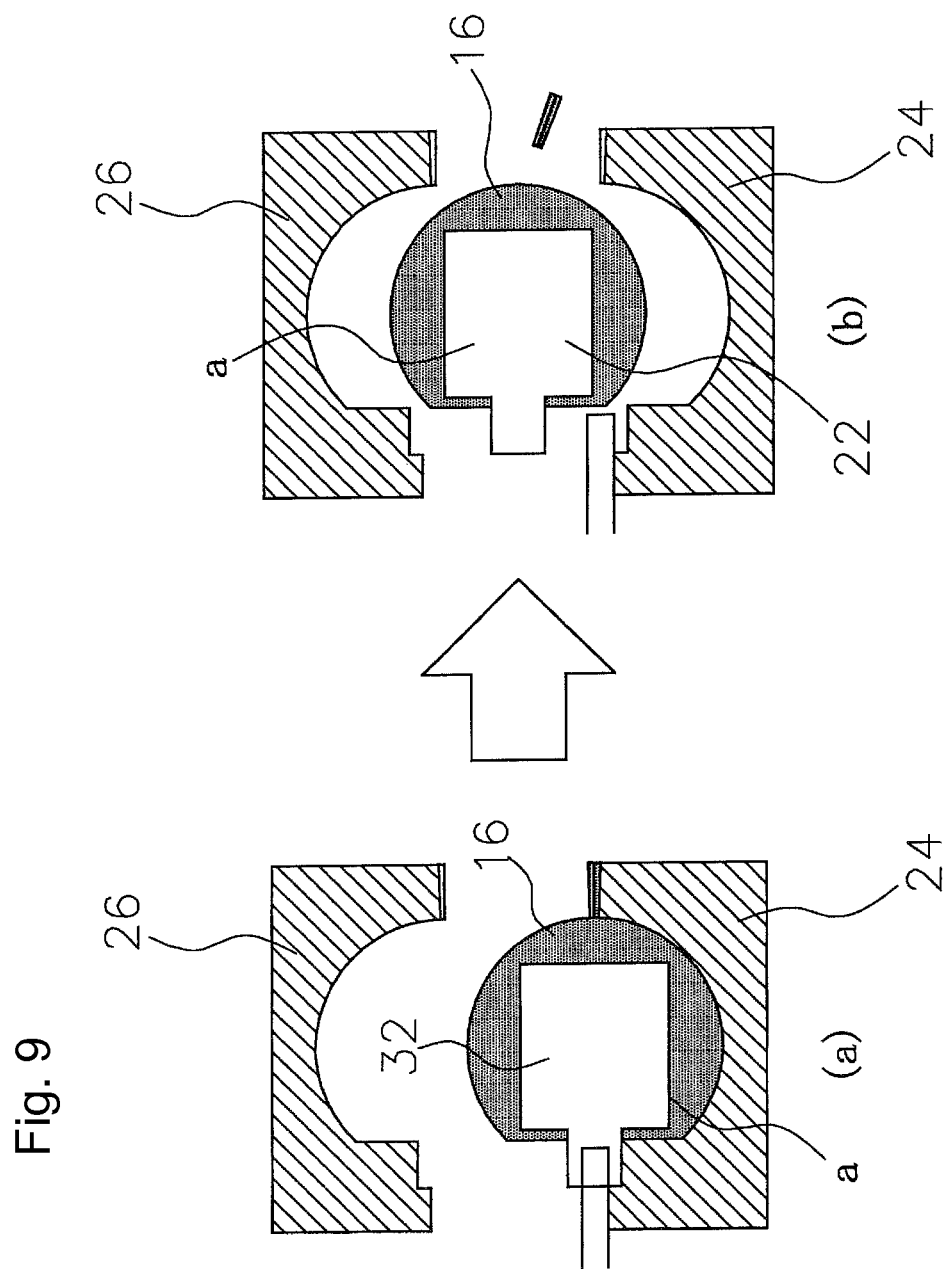
FIG. 9 illustrates a manufacturing method of a synthetic resin hollow body (A) in accordance with another embodiment of the present invention.
Figure 10:
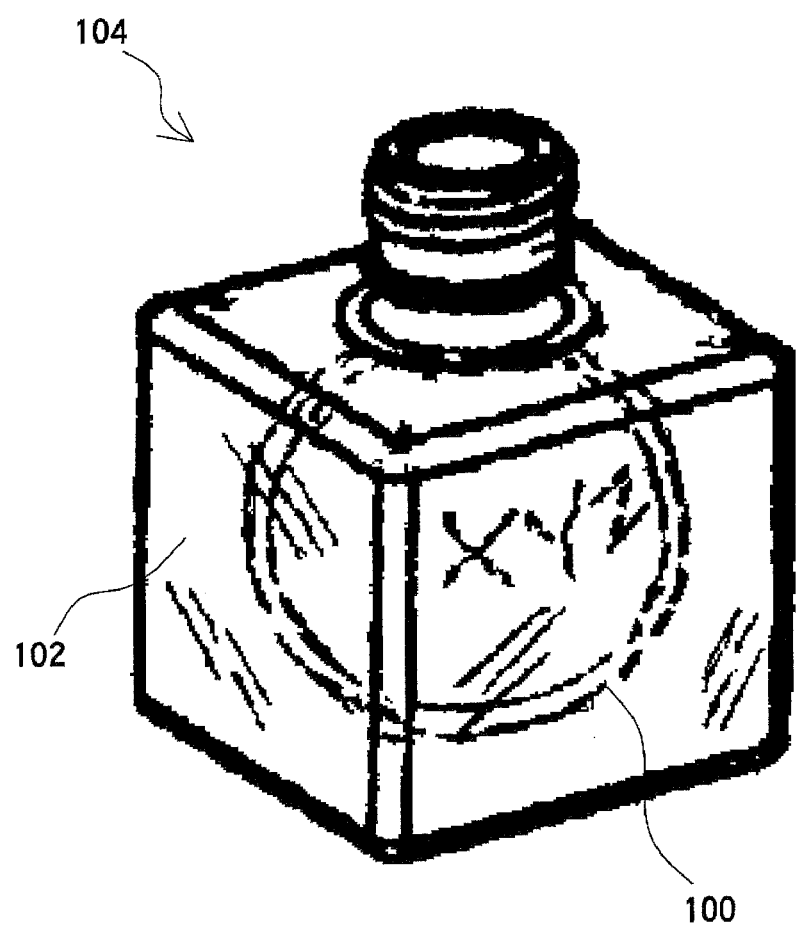
FIG. 10 is a perspective view showing a conventional composite container.

As shown in FIG. 9(a), the metal molds 24 and 26 are then opened. As shown in FIG. 9(b), a runner and a sprue are detached, and a cap member 18 is attached to the opening portion 14. As a result, the synthetic resin hollow body (A) in which the resin sheathing body 16 is formed in an integrating manner with the hollow molding body (a) can be obtained.

In the manufacturing method in accordance with this embodiment, the gas 32 is just made to blow in the hollow molding body (a) in the over-molding on the hollow molding body (a). Consequently, a desired liquid material 22 can be held in the hollow molding body (a) immediately after the molding, thereby further reducing a manufacturing cost as compared with the above manufacturing method.

In the above manufacturing methods of the synthetic resin hollow body (A), the liquid 30 and the gas 32 are individually used as a fluid substance to be flown into the hollow molding body (a). However, a combined use of the liquid 30 and the gas 32 is also possible.

In this case, the liquid 30 is flown into the hollow molding body (a) by the range of 1% to 50%, preferably the range of 5% to 20%. The hollow molding body (a) is then set to the predetermined position in the metal molds 24 and 26 in such a manner that the opening portion 14 is located on the upper side without the cap member 18 attached to the opening portion 14 of the hollow molding body (a).

While the gas 32 having a pressure in the range of 0.04 to 1.0 MPa is made to blow (that is, the gas 32 is made to blow at the pressure in the range of 0.04 to 1.0 Mpa) in the hollow molding body (a) via the opening portion 14, a molten resin is flown into the metal molds 24 and 26 and hardened. As a result, the synthetic resin hollow body (A) in which an external surface of the hollow molding body (a) is covered by the resin sheathing body 16 in an integrating manner can be obtained.

In the case in which a combined use of the liquid 30 and the gas 32 is carried out for a fluid substance to be flown into the hollow molding body (a) as described above, it is not necessary to modify a blowing pressure of the gas 32 in the flowing of the molten resin and in the hardening of the molten resin. Moreover, a heat resistance and a pressure resistance of the hollow molding body (a) in molding can be improved as compared with the case of using only the gas 32. Furthermore, as compared with the case of using only the liquid 30, an amount of the liquid 30 to be filled in the hollow molding body (a) can be reduced, thereby facilitating an exhaust of the liquid 30 from the hollow molding body (a) after molding.

While the preferred embodiments of the present invention have been described above, the present invention is not restricted to the embodiments, and various changes and modifications can be thus made without departing from the scope of the present invention.

For instance, a liquid and a gas are used as a fluid substance in this specification. However, the present invention is not restricted to this case, and powder or the like can also be used.

The invention claimed is:
1. A synthetic resin hollow body, comprising:
a hollow molding body made of a resin; and
a resin sheathing body formed outside the hollow molding body in an integrating manner with the hollow molding body,
wherein at a horizontal cross section passing through the hollow molding body and the resin sheathing body of the synthetic resin hollow body, a minimum thickness of the resin sheathing body is at least 0.1 mm and a difference of a maximum thickness and the minimum thickness is at least 2 mm, and the resin sheathing body is welded to an external surface of the hollow molding body so that a boundary line between the resin sheathing body and the hollow molding body is not visible.

2. The synthetic resin hollow body of claim 1, wherein a shape of the hollow molding body and that of the resin sheathing body are different from each other.

3. The synthetic resin hollow body of claim 1, wherein the resin sheathing body is made of a transparent resin having a total ray transmittance of at least 80% according to JIS K7105 and measured with a sheet having a thickness of 1 mm.

4. The synthetic resin hollow body as defined in claim 3, wherein the transparent resin is an ionomer of an ethylene methacrylate copolymer.

5. The synthetic resin hollow body as defined in claim 3, wherein the transparent resin is an ionomer of an ethylene acrylate copolymer, ethylene methacrylate copolymer, or combination thereof.

6. The synthetic resin hollow body as defined in claim 1, wherein a thickness of center of bottom portion of the resin sheathing body is different from a thickness of peripheral of bottom portion of the resin sheathing body.

7. The synthetic resin hollow body as defined in claim 1, wherein at a vertical cross section passing through the hollow molding body and the resin sheathing body of the synthetic resin hollow body, a side portion of the resin sheathing body over a side wall of the hollow molding body has first and second portions, a thickness of the first portion is different from a thickness of the second portion.

8. A synthetic resin hollow body, comprising:
a hollow molding body made of a resin; and
a resin sheathing body formed outside the hollow molding body in an integrating manner with the hollow molding body,
wherein a thickness of center of bottom portion of the resin sheathing body is different from a thickness of peripheral of bottom portion of the resin sheathing body, and
the resin sheathing body is welded to an external surface of the hollow molding body so that a boundary line between the resin sheathing body and the hollow molding body is not visible.

9. The synthetic resin hollow body as defined in claim 8, wherein the thickness of center of bottom portion of the resin sheathing body is larger than the thickness of peripheral of bottom portion of the resin sheathing body.

10. The synthetic resin hollow body as defined in claim 8, wherein at a vertical cross section passing through the hollow molding body and the resin sheathing body of the synthetic resin hollow body, a side portion of the resin sheathing body over a side wall of the hollow molding body has first and second portions, a thickness of the first portion is different from a thickness of the second portion.

11. The synthetic resin hollow body of claim 8, wherein a shape of the hollow molding body and that of the resin sheathing body are different from each other.

12. The synthetic resin hollow body of claim 8, wherein the resin sheathing body is made of a transparent resin having a total ray transmittance of at least 80% according to JIS K7105 and measured with a sheet having a thickness of 1 mm.

13. The synthetic resin hollow body as defined in claim 12, wherein the transparent resin is an ionomer of an ethylene methacrylate copolymer.

14. A synthetic resin hollow body, comprising:
a hollow molding body made of a resin; and
a resin sheathing body formed outside the hollow molding body in an integrating manner with the hollow molding body,
wherein at a vertical cross section passing through the hollow molding body and the resin sheathing body of the synthetic resin hollow body, a side portion of the resin sheathing body over a side wall of the hollow molding body has first and second portions, a thickness of the first portion is different from a thickness of the second portion, and
the resin sheathing body is welded to an external surface of the hollow molding body so that a boundary line between the resin sheathing body and the hollow molding body is not visible.

15. The synthetic resin hollow body as defined in claim 14, wherein at the vertical cross section passing through the hollow molding body and the resin sheathing body of the synthetic resin hollow body, a thickness of an upper portion of the side portion of the resin sheathing body is smaller than a thickness of a center portion of the side portion of the resin sheathing body.

16. The synthetic resin hollow body as defined in claim 14, wherein at the vertical cross section passing through the hollow molding body and the resin sheathing body of the synthetic resin hollow body, a thickness of a lower portion of the side portion of the resin sheathing body is smaller than a thickness of a center portion of the side portion of the resin sheathing body.

17. The synthetic resin hollow body as defined in claim 14, wherein at the vertical cross section passing through the hollow molding body and the resin sheathing body of the synthetic resin hollow body, the side portion of the resin sheathing body over the side wall of the hollow molding body has first, second, and third portions, thicknesses of the first, second, and third portions are different from each other.

18. The synthetic resin hollow body as defined in claim 17, wherein the first portion is an upper portion of the side portion of the resin sheathing body, the second portion is a center portion of the side portion of the resin sheathing body, and the third portion is a lower portion of the side portion of the resin sheathing body.

19. The synthetic resin hollow body of claim 14, wherein the resin sheathing body is made of a transparent resin having a total ray transmittance of at least 80% according to JIS K7105 and measured with a sheet having a thickness of 1 mm.

20. The synthetic resin hollow body as defined in claim 19, wherein the transparent resin is an ionomer of an ethylene methacrylate copolymer.

* * * * *